UNITED STATES PATENT OFFICE.

WILLIAM A. STEINEMANN, OF LOS ANGELES, CALIFORNIA.

UNFERMENTED MALT BEVERAGE AND PROCESS OF PREPARING THE SAME.

1,237,724.  Specification of Letters Patent.  Patented Aug. 21, 1917.

No Drawing.  Application filed October 21, 1916. Serial No. 126,993.

*To all whom it may concern:*

Be it known that I, WILLIAM A. STEINEMANN, a citizen of the United States, residing at Los Angeles, in the county of Los Angeles and State of California, have invented a new and useful Unfermented Malt Beverage and Processes of Preparing the Same, of which the following is a specification.

This invention relates to malt beverages and processes of preparing the same.

An object of this invention is to provide a novel process, by means of which an unfermented malt beverage resembling beer, ale, malt tonic or the like may be made, such beverage containing substantially less carbohydrates than the malt employed can yield, and having at least such an amount of soluble albuminoids from the malt, as is usually obtained from an equal quantity of like malt in the production of unfermented malt beverages as now manufactured.

By "unfermented" malt beverages, as herein used, I mean malt beverages manufactured to the exclusion of substantially any alcoholic fermentation.

A very pronounced wort taste in malt beverages is very undesirable and is characteristic of the majority of unfermented malt beverages, especially those that have good palate-fullness and good foam stability. The very pronounced wort taste is obtained when the abundance of starch, as is contained in the materials employed in the production of such beverages, is hydrolyzed in the presence of the alubuminoids of the malt, probably, by some change in the albuminoids taking place or the combination of some of the albuminoids with the carbohydrates at the time the abundance of starch is hydrolyzed. Also, the abundance of hydrolyzed starch in such unfermented malt beverages gives them an excessively sweet taste when made to resemble beer, ale or malt tonic.
Also, such large proportion of carbohydrates are undesirable to persons to whom large quantities of carbohydrates are harmful.

My unfermented malt beverage is an improvement over the aforementioned unfermented malt beverage in that substantially less starch is hydrolyzed in the presence of the albuminoids of the malt, particularly in the presence of the active diastase, than the malt employed can yield, and the total carbohydrate content is also substantially less than such malt can yield. Therefore, my unfermented malt beverage, when having good palate-fullness and good foam stability, will not have the very pronounced wort taste and flavor, especially when made to resemble beers, also malt tonics or the like. My unfermented malt beverage contains an unusually lower proportion of carbohydrates and relatively an unusual and remarkably higher proportion of soluble albuminoids, particularly of the desirable kind such as amids, peptones and albumoses, than most unfermented malt beverages contain. Therefore the beverage is very beneficial to many persons as a liquid food or tonic, and especially beneficial to invalids who need nourishment particularly of a predigested kind, or to those who need a tonic free from an abundance of carbohydrates.

To produce my unfermented malt beverage, I may proceed in detail as follows: A mixture of malt and water is made, preferably slightly acid, so as to be suitable for the enzym peptase to act. The malt is finely crushed before or after such mixing or both before and after, but is preferably coarsely crushed before mixing and then finely ground after such mixing, and after the starch granules have been softened, thereby separating the starch granules more thoroughly and incidentally liberating more of the soluble albuminoids which are desired in my beverage. In this way there is less danger of excessively rupturing the starch granules, than when the material is finely ground in the dry form. Ruptured starch granules are readily soluble and readily attacked by the active diastase in the mixture, so therefore, extreme care must be taken not to excessively rupture the starch granules in the grinding process. The husks of the malt may be removed and only the mealy body of the malt employed.

Any other suitable material containing albuminoids, particularly unmalted cereals or parts thereof such as barley, rice, corn grit, bran, middlings and the like may be employed together with the malt, without departure from my invention and the total material so employed must contain a sufficient amount of its extractable carbohydrates in an insoluble starch form, that the extract or extraction for my unfermented malt beverage can be obtained therefrom by aqueous extraction to the exclusion of such carbohydrates in insoluble starch form, as would defeat my aforesaid object. The temperatures of the above mixture must be such as will not cause the insoluble starch as is necessary to exclude from the extract, to become gelatinized, dissolved or hydrolyzed, at or prior to the time the extraction is obtained to the exclusion of such an amount of insoluble starch. I preferably make the aqueous mixture at 47° C. or thereabout, which is a good temperature for peptonization to take place therein and the mixture is held at that temperature or thereabout until suitable peptonization has taken place, but not long enough to cause the insoluble starch that is to be excluded from the extraction, to become gelatinized, dissolved or hydrolyzed. To allow suitable peptonization to take place without causing the insoluble starch which is to be excluded, to become gelatinized, hydrolyzed or dissolved, the mixture is preferably held at the above temperature for about thirty minutes. The time for holding the mixture at certain temperatures and the temperatures to be used for peptonization are varied dependent upon the character of the mixture and may be readily determined, since it is made clear that the mixture should not be held at certain temperatures for too long a period. The mixture is also well stirred, which aids in separating the starch granules still more, thereby liberating more of the desirable albuminoids from between the granules of starch. The proportion of water must be such that the extraction can readily be obtained. I next obtain the extraction from the mixture to the exclusion of that amount of insoluble starch that is desired to be excluded, by decantation, filtration, or any other suitable method. I may obtain repeated extractions to the exclusion of such insoluble starch, to further obtain the desirable substances left in the balance of said mixture, with additional water, subsequent to the main extraction and add such substances to said main extraction. The extraction may next be peptonized at suitable temperatures for peptonization, such temperatures preferably ranging from 35 to 55° C. Saccharification takes place during this peptonization but is best completed at temperatures ranging between 55 and 70° C. It is not practical to mention the exact temperatures in this connection since such temperatures must be gaged in accordance with the character of the extract. I next heat the extraction to such temperatures that will destroy the actions of the enzym diastase, particularly, preferably by boiling the extraction. I may treat the extraction or beverage with hops, juniper berries or other condiment or spice, to give it the desired taste and flavor. Also I may medicate the beverage by various medicinal agents, thereby enhancing the tonic and food values of the beverage. The process may be completed by cooling the beverage which may then be carbonated, filtered, bottled and pasteurized.

If desired, I may allow an alcoholic fermentation to take place in my unfermented malt beverage and if thoroughly fermented a beer, ale, malt tonic or the like, having a lighter alcoholic content than is contained in the average beer, ale or malt tonic, besides having good palate-fullness and good foam stability will be provided. The reason for the light alcoholic content is that my finished unfermented malt beverage when compared to the ordinary malt wort as now manufactured contains an unusually small proportion of carbohydrates or fermentable sugars and a relatively higher proportion of desirable albuminoids.

My unfermented malt beverage may also be employed as a body and foam producer, in other unfermented or fermented beverages.

I claim:

1. The process of preparing an unfermented malt beverage which consists in mixing crushed malt containing a substantial amount of insoluble starch with water and then obtaining an extract from the mixture to the exclusion of a substantial amount of insoluble starch.

2. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch.

3. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch, and then allowing complete saccharification.

4. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch and then allowing complete saccharification, and then heating the extract to destroy the active diastase.

5. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch, then allowing complete saccharification, and then boiling the extract.

6. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch, then allowing complete saccharification, and then boiling the extract with hops.

7. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch, then allowing complete saccharification, and then boiling the extract with condiments or spices.

8. The process of preparing an unfermented malt beverage which consists in mixing crushed malt containing a substantial amount of insoluble starch with water at temperatures suitable for peptonization to take place and then obtaining an extract from the mixture to the exclusion of a substantial amount of insoluble starch, then further peptonizing the extract and allowing complete saccharification, and then boiling the extract with condiments or spices.

9. The process of preparing an unfermented malt beverage which consists in mixing malt and water at a suitable temperature for peptonization to take place and then obtaining an extract from the mixture to the exclusion of a substantial amount of the carbohydrates of the malt which are in starch form.

10. The process of preparing an unfermented malt beverage which consists in mixing malt and water at a suitable temperature for peptonization to take place, allowing settling of the carbohydrates in starch form that are to be excluded from the mixture and then obtaining an extraction from the mixture to the exclusion of a substantial amount of the carbohydrates of the malt which are in insoluble starch form.

11. The process of preparing a malt beverage which consists in mixing malt and water at a suitable temperature for peptonization to take place and obtaining an extract from the mixture to the exclusion of a substantial amount of the insoluble starch of the malt and then heating the extract to a degree which will destroy the action of the enzyms.

12. The process of preparing an unfermented malt beverage which consists in mixing malt and water, heating the mixture to a temperature suitable for desired peptonization to take place without causing a substantial hydrolyzing, dissolving or gelatinizing of the insoluble starch of the malt, obtaining an extract from the malt to the exclusion of a substantial amount of the insoluble starch of the malt, further heating the extract for peptonization to take place and then boiling the extract to destroy the action of the enzym.

13. The process of preparing an unfermented malt beverage which consists in mixing malt and water, heating the mixture to a temperature suitable for desired peptonization to take place without causing a substantial hydrolyzing, dissolving or gelatinization of the starch of the malt, obtaining an extract from the malt to the exclusion of a substantial amount of the starch of the malt, further heating the extract for peptonizaton to take place, then boiling the extract to destroy the action of the enzym diastase, and adding suitable condiments or spices.

14. The process of preparing an unfermented malt beverage which consists in causing peptonization of malt in aqueous media at a suitable temperature for peptonization to take place and then obtaining an extract therefrom before a substantial amount of the carbohydrates of the malt in starch form have been hydrolyzed, dissolved or gelatinized whereby the extract has a carbohydrated content less than the total carbohydrate yield of the malt.

15. The process of preparing an unfermented malt beverage which consists in mixing malt which has been crushed with water at a suitable temperature for peptonization to take place, allowing a substantial proportion of the carbohydrates in starch form to settle in the mixture and obtaining an extraction from the mixture prior to a substantial hydrolyzation, dissolution or gelatinization of the insoluble starch to the exclusion of a substantial amount of such starch.

16. The process of preparing an unfermented malt beverage which consists in mixing malt which has been crushed with water at a suitable temperature for peptonization to take place, obtaining an extract by decantation from the mixture prior to a substantial hydrolyzation, dissolution or gelatinization of the starch to the exclusion of a substantial amount of such starch, then further heating the extract for peptonization to take place, and completely saccharifying the extract, and then thoroughly heating the extract to the extent that the actions of the enzyms are nullified.

17. The process of preparing an unfermented malt beverage which consists in mixing malt which has been crushed with water at a suitable temperature for peptonization to take place, obtaining an extract by filtration from the mixture prior to a substantial hydrolyzation, dissolution or gelatinization of the starch to the exclusion of a substantial amount of such starch, then further heating the extract for peptonization to take place and then thoroughly heating the extract to the extent that the actions of the enzyms are nullified and adding suitable condiments or spices to the extract.

18. The process of preparing an unfermented malt beverage which consists in mixing malt which has been crushed with water at a suitable temperature for peptonization to take place, allowing a substantial proportion of the carbohydrates in starch form to settle in the mixture and obtaining an extract from the mixture prior to a substantial hydrolyzation, dissolution or gelatinization of the starch to the exclusion of a substantial amount of such starch, then further heating the extract for peptonization to take place, then thoroughly heating the extract to the extent that the actions of the enzyms are nullified, adding suitable condiments or spices to the extract, filtering and then carbonating the extract.

19. An unfermented malt beverage whose carbohydrate content is less than that of the total extractable carbohydrate yield of the malt.

20. An unfermented malt beverage which has a carbohydrate content substantially less than the total amount which the malt can yield, and a soluble albuminoid content equal substantially to the total soluble albuminoid yield of the malt.

21. An unfermented malt beverage which has a carbohydrate content substantially less than the total amount which the malt can yield and an albuminoid content equal substantially to the total albuminoid yield of the malt and in which the action of the enzyms has been nullified.

22. The process of preparing an unfermented malt beverage which consists in mixing crushed malt containing a substantial amount of insoluble starch with water, obtaining an extract from the mixture to the exclusion of a substantial amount of insoluble starch, peptonizing the extract, allowing saccharification to take place, and then boiling the extract.

23. An unfermented malt beverage which contains substantially less carbohydrates than the malt employed can yield and at least such an amount of soluble albuminoids from the malt as is usually obtained from an equal quantity of like malt in the production of unfermented malt beverages as generally manufactured.

24. The process of preparing an unfermented malt beverage which consists in mixing crushed malt containing a substantial amount of insoluble starch, with water, then obtaining an extract from the mixture to the exclusion of a substantial amount of insoluble starch, then causing complete saccharification to take place in the extract, and then boiling the extract.

Signed at Los Angeles, California, this 16th day of October, 1916.

WILLIAM A. STEINEMANN.

Witnesses:
CHAS. J. CHUNN,
L. BELLE WEAVER.